(12) United States Patent
Doleschel et al.

(10) Patent No.: US 6,874,406 B2
(45) Date of Patent: Apr. 5, 2005

(54) PISTON ROD-LESS LINEAR DRIVE

(75) Inventors: Bernd Doleschel, Wendlingen (DE);
Thomas Wagner, Remseck (DE);
Gerhard Krafft, Ostfildern-Ruit (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 10/703,788

(22) Filed: Nov. 6, 2003

(65) Prior Publication Data

US 2004/0103781 A1 Jun. 3, 2004

(30) Foreign Application Priority Data

Dec. 3, 2002 (DE) .......................................... 102 58 139

(51) Int. Cl.$^7$ ............................................... F01B 29/00
(52) U.S. Cl. ........................................................ 92/88
(58) Field of Search .......................... 92/88, 85 R, 129

(56) References Cited

U.S. PATENT DOCUMENTS 5,469,775 A    11/1995  Stoll et al.
6,308,821 B1   10/2001  Asai et al.
6,338,294 B1    1/2002  Wagner et al.
6,505,542 B2 *  1/2003  Weberruss et al. ............. 92/88
2002/0023534 A1 2/2002  Weberruss et al.

FOREIGN PATENT DOCUMENTS

DE         942179       4/1956
EP         0722046 A2   7/1996

* cited by examiner

*Primary Examiner*—Thomas E. Lazo
(74) *Attorney, Agent, or Firm*—Hoffmann & Baron, LLP

(57) ABSTRACT

A piston rod-less linear drive having a drive part adapted for motion in the longitudinal direction of the housing, such drive part being kinematically coupled by way of an entraining member running in a longitudinal slot in the housing with a guide slide arranged externally on the housing for sliding movement. For the connection between the entraining member and the guide slide a force transmitting part is provided which has a coupling socket in which the entraining member interlockingly fits by means of a coupling section in the longitudinal direction of the housing.

15 Claims, 4 Drawing Sheets

PISTON ROD-LESS LINEAR DRIVE

BACKGROUND OF THE INVENTION

The invention relates to a piston rod-less linear drive comprising an elongated housing which defines a receiving space for a drive part adapted to run in the longitudinal direction of the housing and being kinematically coupled by way of an entraining member with a guide slide, such entraining member extending through a longitudinal slot in the housing, such slide being arranged to be moved on a linear guide, which is attached to the housing, in the longitudinal direction of the housing.

THE PRIOR ART

In the case of a linear drive of this type disclosed in the European patent publication 1 282 359 A1 the entraining member has its outer end section fitting into a recess, which faces away from the guide slide, and is permanently screwed to the guide slide. In connection with the attachment points permanently set by the screws the resulting rigid connection may lead to strains in the system during operation, if owing to manufacturing inaccuracies there is no exact parallelism between the path of the drive part and the path of the guide slide. Furthermore the manner of attachment selected has an unfavorable effect on the manufacturing and assembly costs.

SHORT SUMMARY OF THE INVENTION

One object of the present invention is to provide a piston rod-less linear drive with an optimized kinematic coupling between the entraining member and the guide slide.

In order to achieve these and/or other objects appearing from the present specification, claims and drawings, in the present invention there is a provision in the case of a piston rod-less linear drive of the type initially mentioned such that the entraining member has a coupling section, which is formed by its outer end section, fitting between the guide slide and a force transmitting part attached to it, the entraining member being engaged, without any direct attachment to the guide slide by way of a plug connection, in an interlocking manner with a coupling socket, such coupling socket being formed on the inner side, facing the guide slide, of the force transmitting part.

Thus the kinematic coupling is not directly provided between the entraining member and the guide slide, but by the intermediary of a separate force transmitting part, which on the one hand is secured to the guide slide and on the one hand as part of a plug connection is so engaged with the coupling section that between it and the coupling section there is, in the longitudinal direction of the housing, an interlocking and play-free connection. Since the coupling socket is located on the inner side, facing the guide slide, of the force transmitting part, there is the possibility of producing the desired interlocking plug connection in one working operation during assembly of the force transmitting part on the slide. It is for example possible to install the guide slide on the one hand and the drive unit, comprising the drive part and the entraining member, on the other hand independently of each other on the linear drive and then later, after suitable alignment, to produce the desired kinematic coupling by putting on the force transmitting part. Then the plug connection does offer the advantage that the relative position existing in the mounted state between the entraining member the and the force transmitting part is adjustable and accordingly may be no strains are produced athwart the longitudinal direction of the housing during assembly.

Further advantageous developments of the invention are defined in the claims.

The coupling section may be so interlockingly secured in the coupling socket that on the exertion of a certain force there is a relative mobility between these components in a transverse plane at a right angle to the longitudinal direction of the housing. Therefore there is then the possibility of allowing relative movement between the entraining member and the force transmitting part in the said transverse plane during the linear movement so that these components may automatically cancel each other out if there are any departures from parallelism of the paths of the drive part and the guide slide.

The coupling socket is preferably designed with two limit lateral faces aligned in the longitudinal direction of the housing and facing each other, between which the entraining member has its coupling section extending in an interlocking manner. The coupling socket may more especially be constituted by a recess provided on the inner side of the force transmitting part. In this case the lateral limit faces of the recess may be formed on rib-like projections on the force transmitting part.

The design in accordance with the invention renders it possible to have a force transmitting part which may be manufactured extremely economically as an integral plastic molding. More particularly, in the case of such a plastic part it is an advantage for the force transmitting part to be like a housing and to be without a wall at its inner side facing the guide slide so that the coupling socket is freely accessible.

The force transmitting part is preferably arranged to the side on the guide slide on the guide slide so that the top side of the guide slide remains free and available for the mounting of components to be shifted.

It is furthermore an advantage if the force transmitting part, in addition to the force transmitting function, also performs the function of a cover for the section, which is outside the longitudinal slot, of the entraining member and furthermore for the length section, lying outside the longitudinal slot, at the same axial level as the guide slide. Accordingly inter alia it is possible to prevent undesired soiling of readily damaged faces. In this respect it is convenient to match the length of the force transmitting part in accordance with the length of the guide slide.

On the force transmitting part and on the guide slide it is convenient to provide centering means which interlock with each other athwart the longitudinal direction of the housing for the purpose of force transmission athwart the longitudinal direction of the housing. Such means more especially comprise one or more pairs of interlocking and complementary centering projections and centering recesses. Accordingly the kinematic coupling between the force transmitting part and the guide slide takes place in a similar manner to that between the force transmitting part and the entraining member.

For the attachment of the force transmitting part on the guide slide it is for example possible to provide a screw connection. In case of need such screw connection may produce a non-positive clamping action between the force transmitting part and the guide slide in order to ensure or to prevent the transmission of a setting force.

The linear drive may also be of the electrically driven type and for example have a lead screw drive, which may linearly move a drive part in the form of a lead screw nut. It is more particularly advantageous however to have a design in the case of which the drive part is in the form of a piston and which uses fluid actuation as the operating force. In such a case the longitudinal slot is provided with a band-like seal means which prevents uncontrolled passage of fluid through the longitudinal slot.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

DETAILED ACCOUNT OF WORKING EMBODIMENT OF THE INVENTION

Figure 1:
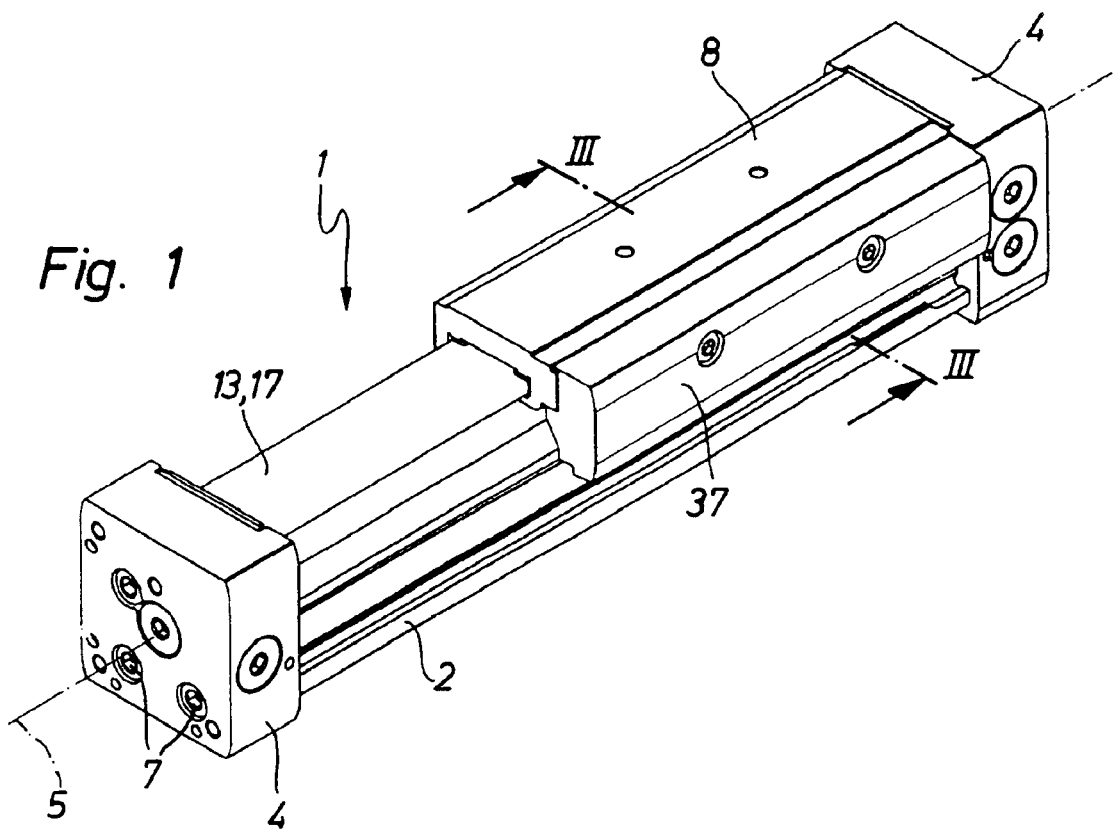
FIG. 1 shows a preferred first design of the linear drive of the invention in a perspective view.
Figure 2:
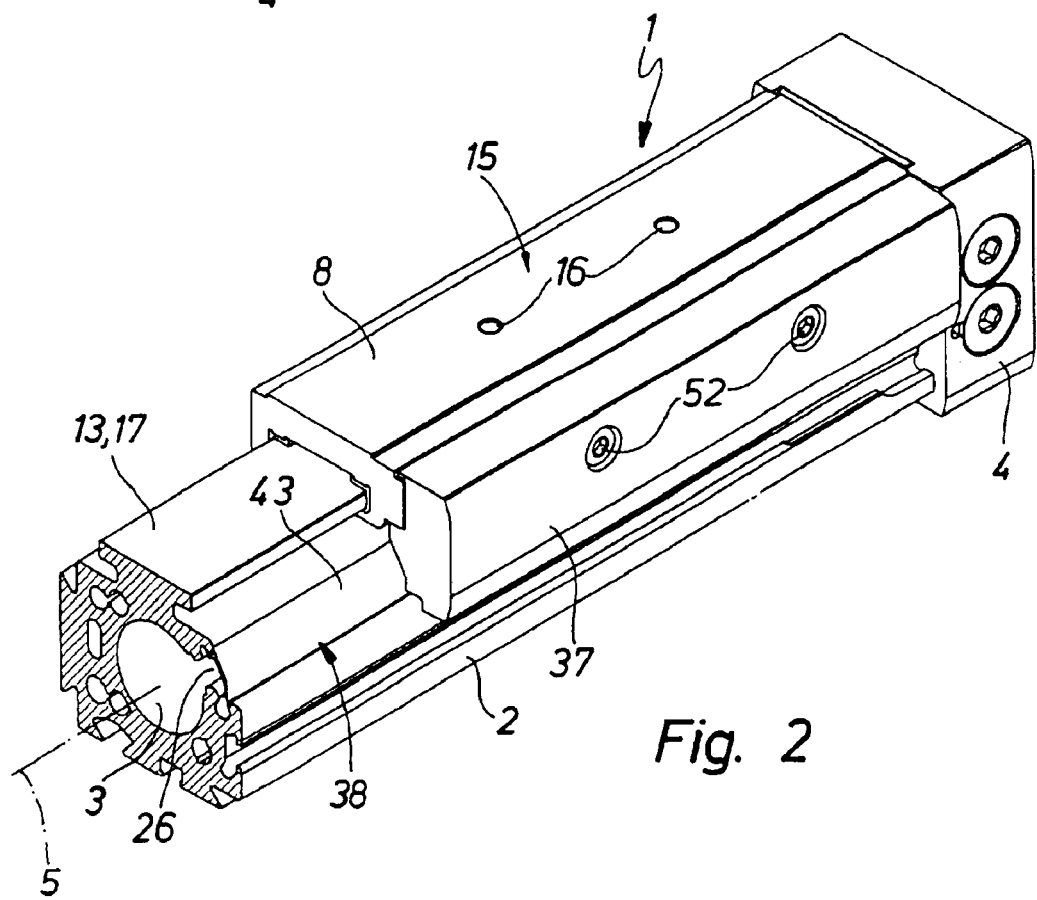
FIG. 2 is a view of part of the linear drive of FIG. 1 on a slightly larger scale, the housing being sectioned to show its cross section.

The working example comprises a piston rod-less linear drive generally referenced 1 in the form of a design to be more particularly operated by fluid. It is more particularly intended for operation with compressed air.

The linear drive 1 possesses an elongated housing 2 which is tubular in design and in the interior delimits a preferably cylindrically shaped receiving space 3, which at both ends is closed by end plates 4 attached to the housing 2.

In the interior of the receiving space 3 there is a drive part 6 able to be driven in the longitudinal direction of the housing as marked in chained lines and being in the form of a piston dividing the receiving space 3 into two axially successive working chambers in a fluid-tight manner. By way of connection ports 7, which in the working example are both provided on a single end plate 4, supply and venting of pressure medium may take place in an out of the working spaces. Thus the drive part 6 may be caused to perform a drive movement in the longitudinal direction of the housing.

The drive movement of the drive part 6 may be imparted to a guide slide 8 outside the housing 2, such slide being kinematically coupled with the drive part 6 by means of an entraining member 12 in the longitudinal direction of the housing.

The guide slide 8 runs on a linear guide 13 in the longitudinal direction of the housing 5 so that its position may be changed as desired. For this purpose the guide slide 13 is aligned so as to be practically parallel to the housing 2. Preferably, the linear guide 13 is arranged on the outer face of the housing, it being connected along its entire length with the housing 2 in the working embodiment. It is preferably constituted by a guide rail 17, which is more particularly secured to the outer face of the housing 2 without the use of screws. The working embodiment constitutes a design, in the case of which the guide slide 17 is produced integrally with the housing 2, more especially by extruding.

Preferably the guide slide 8 has a U-like cross section and straddles the linear guide 13. In this respect its two slide limbs 11, which flank the linear guide 13 on opposite longitudinal sides, cooperate with a respective guide section 23 provided on the respective longitudinal side of the linear guide 13. The latter are preferably constituted by guide tracks, which extend along the entire length of the linear guide 13. The slide limbs 11 may be provided with anti-friction bearing means or plain bearing means 10 for cooperation with the guide section 23.

Accordingly the guide slide 8 is supported from all sides on the linear guide 13 except in the longitudinal 5 direction of the housing. On its top side facing away from the linear guide 13 it has a support face 15, on which attachment means 16 are provided so that on such support face 15 a load to be transported may be secured.

At one point on the periphery of the receiving space 3 the wall of the housing 2 is provided with a longitudinal slot 26.

Figure 3:
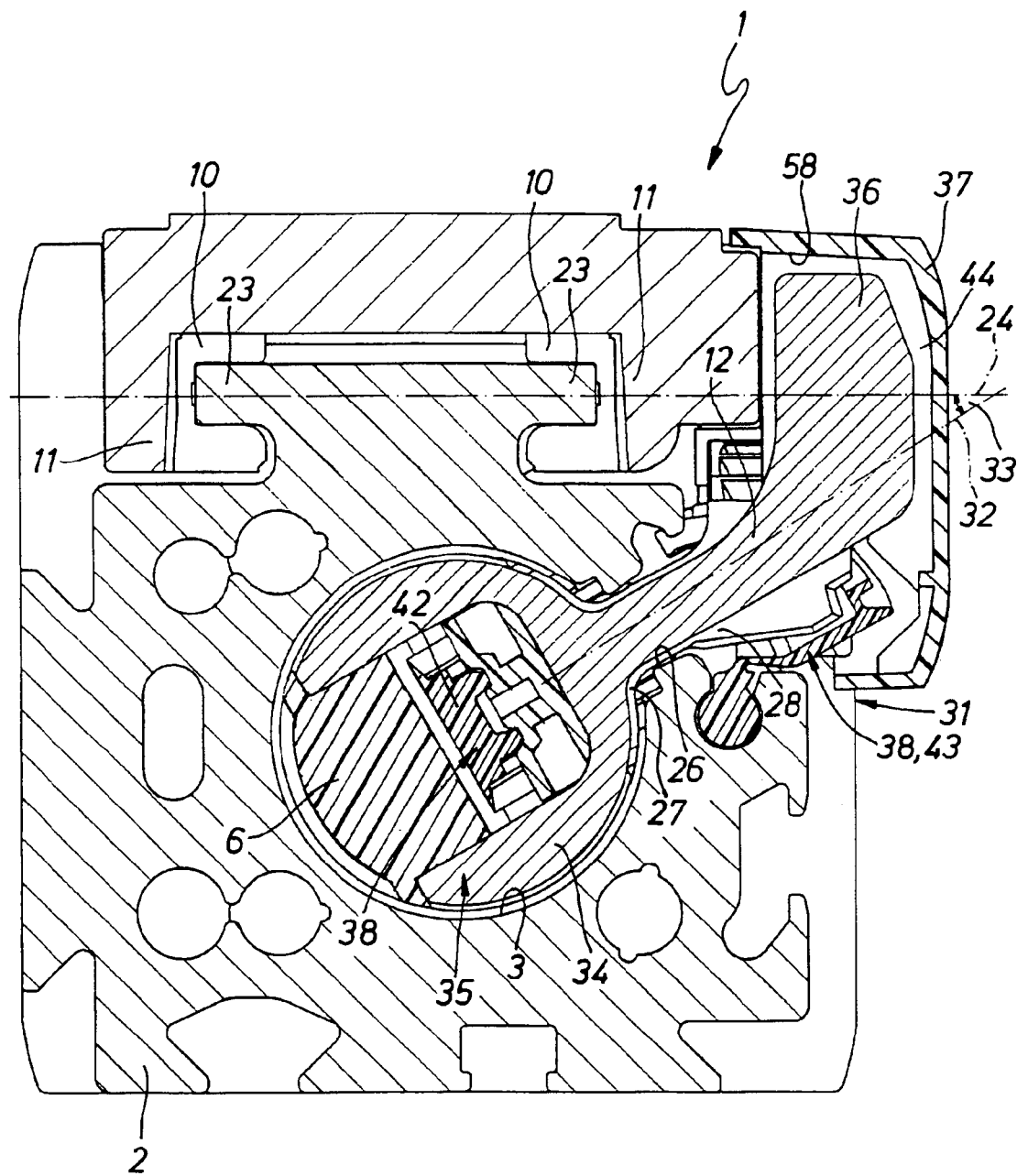
FIG. 3 is a cross section taken through linear drive on the section line III—III adjacent to the entraining member.
Figure 4:
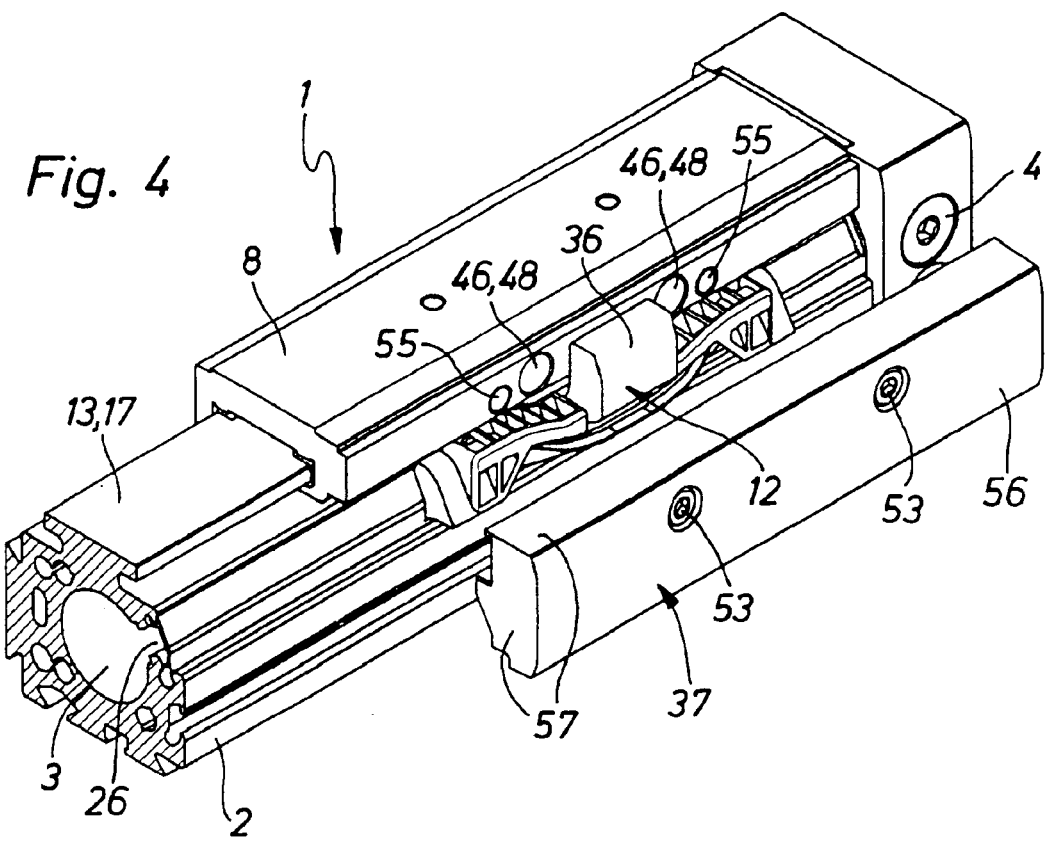
FIG. 4 is a view of part of the drive corresponding to FIG. 2 with the force transmitting part removed.
Figure 5:
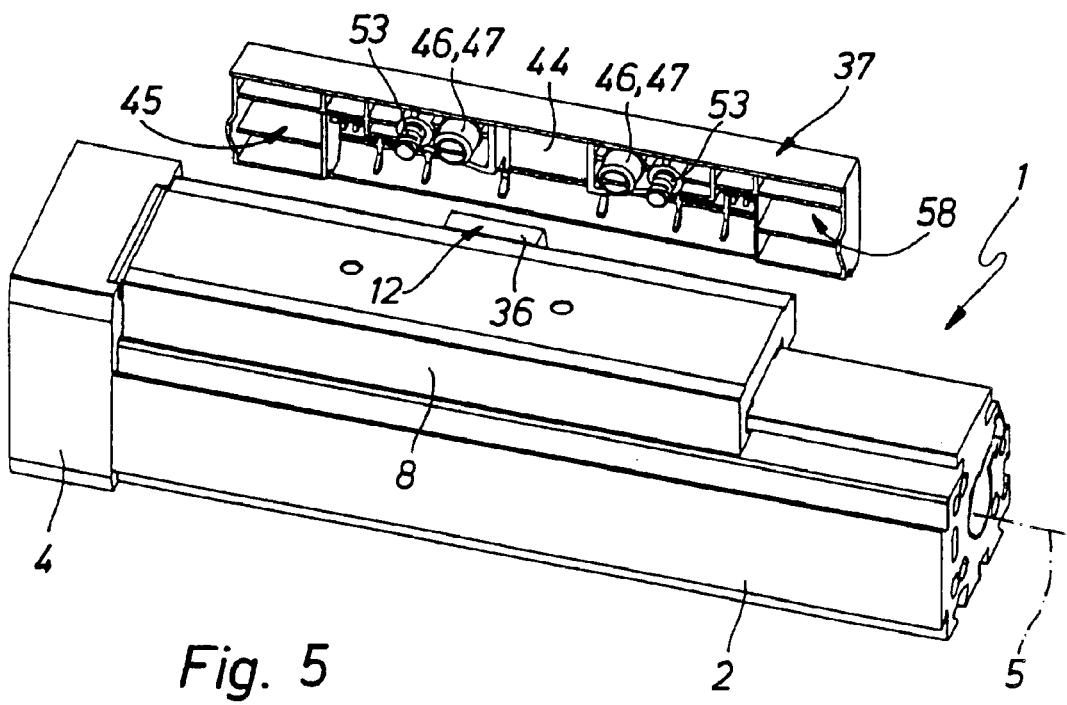
FIG. 5 shows the arrangement of FIG. 4 looking in the opposite direction so that it is possible to see the inner side of the force transmitting part which is shown as being taken off.
Figure 6:
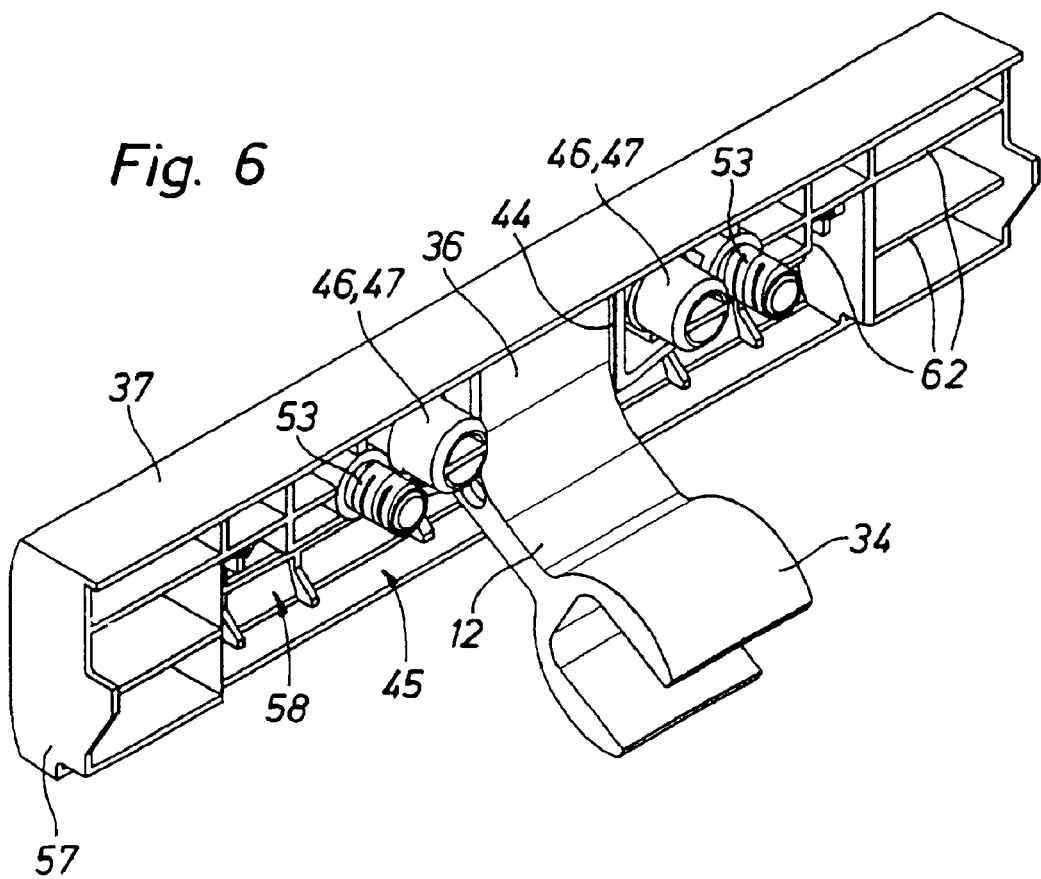
FIG. 6 is a separate view of the force transmitting part and of the entraining member in the coupled state.
Figure 7:
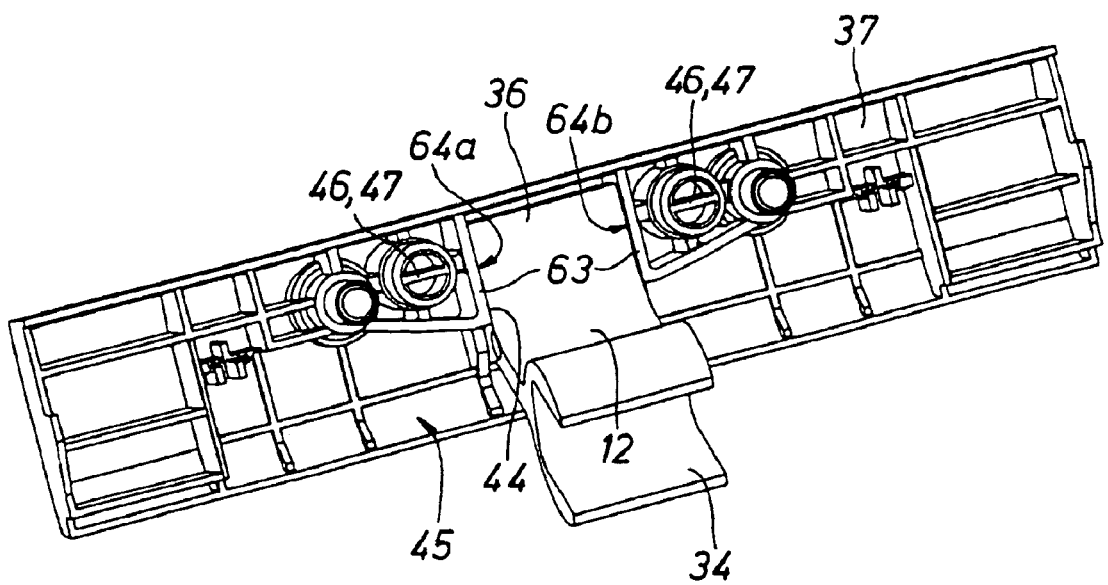
FIG. 7 shows the arrangement of FIG. 6 but looking in a different direction.

At an inner opening 27 the longitudinal slot opens into the receiving space 3 while at an opposite outer slot aperture 28 it opens at the longitudinal outer face 31 of the housing 2. Preferably, the longitudinal slot 26 extends along the entire length of the housing 2. It runs in a slot plane 32 indicated in chained lines, which in the working example is at an angle to a guide plane 24 defined by the two guide sections 23 of the linear guide 13, that is to say more particularly at an acute angle 33 indicated in FIG. 3. The outer slot opening 28 faces the guide plane 24.

The above mentioned entraining member 12 extends through the longitudinal slot 26. It is so kinematically coupled by means of an inner end section, in the following termed the attachment section 34, with the drive part 6 that with the latter it constitutes a drive unit 35, which at all times can only moved jointly in the longitudinal direction 5 of the housing. In other words the entraining member 12 takes part in the linear movement of the drive part 6 in a play-free manner.

In the working example the attachment section 34 is designed like a fork or is bifurcate and is slipped onto the drive part 6 from the side that in the longitudinal direction 5 of the housing there is a play-free interlocking connection.

By way of its outer end section, which is clear of the longitudinal slot 26 and is termed its coupling section 36, the entraining member 12 is indirectly, that is to say with the interposition of a force transmitting part 37 coupled with the guide slide 8 in the longitudinal direction 5 of the housing also in a manner free of play. Thus the drive part 6, the entraining member 12, the force transmitting part 37 and the guide slide 8 constitute a motion unit which at all times may only be moved linearly en bloc or as a single unit.

More especially when the linear drive 1 has a fluid operated design, the longitudinal slot 26 is provided with a band-like, flexureally flexible seal means 38, which is capable of sealing of the longitudinal slot 26 axially on either side of the entraining member 12 from the surroundings so that the desired fluid actuation is possible. In the vicinity of the entraining member 12 the seal means 38 is moved clear of the longitudinal slot 26 in order to permit through the entraining member 12 to extend through the slot. In the working embodiment the seal means 38 comprises an inner sealing band 42, which is responsible for the said sealing action, such band being able to cooperate with the flanks of the longitudinal slot 26. In a complementary manner the working example also includes an outer cover band 43, which in the vicinity of outer slot opening 28 prevents access of dirt into the longitudinal slot 26.

The linear drive is characterized by a particularly advantageous kinematic coupling between the entraining member 12 and the guide slide 8. The coupling is such that the entraining member 12 has its coupling section 36, see FIG. 3, fitting between the guide slide 8 and the force transmitting part 37 attached to it, the coupling section 36, without being directly attached to the guide slide 8, being engaged with a coupling socket 44 as a plug connection, such coupling socket being located on the inner side 45, facing the guide slide 8, of the force transmitting part 37. In this case the plug connection is so designed that in the longitudinal direction of the housing there is an interlock between the coupling section 36 and the coupling socket 44 so that in the longitudinal direction 5 of the housing there is a play-free entraining connection between the entraining member 12 and the force transmitting part 37.

Since the force transmitting part 37 for its part is coupled kinematically in a play-free manner with the guide slide 8 there is accordingly the desired play-free entraining connection desired between the above mentioned components.

The respective connection for the transmission of setting force between the force transmitting part 37 and the guide slide 8 is performed using centering means 46 provided on these two components and interlocking with each other athwart the longitudinal direction 5 of the housing. These centering means comprise, in the working example, two pairs of interlocking complementary centering projections 47 and centering recesses 48. Preferably, the centering projections 47 are pin-like and the centering recesses 48 are like drilled holes.

In the working embodiment two pairs of such centering projections 47 and centering recesses 48 are provided spaced apart in the longitudinal direction 5 of the housing, the coupling socket 44 and the coupling section 36 being preferably. In the working embodiment the centering projections 47 are located on the force transmitting part 37 and extend toward the guide slide 8 and the centering recesses 48 arranged opposite. This arrangement could however be reversed.

During the assembly of the force transmitting part 37 simultaneously both the plug connection between the coupling section 36 and the coupling socket 44 and also between the centering means 46 is produced. The force transmitting part 37 is then put in place athwart the longitudinal direction 5 of the housing on the guide slide 8. The point of mounting the force transmitting part 37 is preferably located to the side on the guide slide 8, preferably near the point of intersection of the guide plane 24 and the slot plane 32.

The force transmitting part 37 is more particularly set at the same level as the guide plane 24.

The centering means 46 constitute precision connections, which in the working example provide a play-free connection except in the direction of plugging together.

In order to secure the force transmitting part 37 on the guide slide 8, in the working example the force transmitting part is additionally screwed to the guide slide 8. In the working embodiment two screw connections 52 are provided, which are effective in the insertion direction of the force transmitting part 37 athwart the longitudinal direction 5 of the housing and respectively comprise an attachment screws 53 bearing against the force transmitting part 37, such screws being able to be screwed into a complementary threaded hole 55 in the guide slide 8, more particularly in a detachable manner.

As a consequence of the screw connections 52 the force transmitting part 37 is clamped against the side face of the guide slide 8 with its inner face to the fore.

The force transmitting part 37 is preferably in the form of an integral plastic molding. It may be produced by injection molding. Preferably it is designed like a housing, it representing a hollow body, which is open on the inner side 45 and in other respects is closed. Consequently it has an outer wall 56 opposite to the inner side 45 and a circumferential side wall 57.

Inside the inner space 58 delimited by the outer wall 56 and the side wall 57, of the force transmitting part 37 there are rib-like struts 62, which endow the housing structure with the necessary mechanical strength.

The force transmitting part 37 preferably extends along the entire length of the guide slide 8. In the working embodiment it simultaneously constitutes a cover for the section, lying outside the longitudinal slot 26, of the entraining member 12 and the length section, lying respectively at the same axial level as the guide slide 8, of the longitudinal slot 26. The covering function is also to be readily perceived in FIG. 3. It is accordingly possible to prevent dirt having access to the slot 26 when the outer covering band 43 is lifted adjacent to entraining member 12.

The coupling socket 44 is located in the interior 58 of the cover-like force transmitting part 37, such force transmitting part being mounted like a cover or lid on a side face of the guide slide 8 with its open side to the fore. Since the height of the force transmitting part 37 is made so large that it simultaneously covers the adjacent length section of the longitudinal slot 26, the entraining member 12 is nevertheless able to extend without hindrance into the inner space 58 to make mating engagement with the coupling socket 44 provided here.

In the working embodiment the coupling socket 44 is formed by a recess constituted on the inner side 45 of the force transmitting part 37. The floor of the recess constitutes the outer wall 56. On the sides facing in the longitudinal direction 5 of the housing the recess is delimited by rib-like projections 63, which extend athwart the longitudinal direction 5 of the housing and are integrally formed on the inner face of the outer wall 56 and the side wall 57.

The faces of the projections 63, which face one another in the longitudinal direction 5 of the housing form lateral delimiting faces 64a and 64b of the coupling socket and between them the coupling section 36 of the entraining member 12 fits.

The width dimension of the coupling section 36 as measured in the longitudinal direction 5 of the housing and of the coupling socket 44 may be matched to each other that the coupling section 36 is held in place with a slight bracing effect. More particularly, the coupling section 36 may be press fitted in the coupling socket 44 as part of the plugging operation.

However there is the convenient possibility of so designing the plug connection that the coupling section 36 is able to be moved in a transverse plane, set at a right angle to the longitudinal direction of the housing, in relation to the force transmitting part 37 and accordingly to the guide slide 8 as well, at least to a limited extent. This transverse plane extends at a right angle to the longitudinal direction 5 of the housing. It is therefore possible to have an automatic compensation of manufacturing inaccuracies, if the above mentioned motion unit is moved along the housing 2 and the paths of movement of the drive part 6 and of the guide slide 8 do not run in exact parallelism owing to manufacturing inaccuracies.

The relative position of the coupling section 36 and the coupling socket 44 assumed in the plugged together state may vary within the transverse plane, extending at a right angle to the longitudinal direction 5 of the housing. More particularly different depths of insertion and of placing on are possible. This ensures that the desired interlocking plug connection may be produced irrespectively of the actual relative position at the time of putting on the force transmitting part 37, of the entraining member 12 and the guide slide 8. Therefore during assembly by plugging, which owing to the centering means 46 brings about the desired association between the force transmitting part 37 unit guide slide 8, there is an automatic compensation of manufacturing inaccuracies as regards the relative position of the entraining member 12 and the force transmitting part 37. Assembly is accordingly extremely simple and there are only simple requirements in all as regards manufacturing inaccuracies, something which reduces manufacturing and assembly costs.

What is claimed is:

1. A piston rod-less linear drive comprising an elongated housing which defines a receiving space for a drive part adapted to run in the longitudinal direction of the housing and being kinematically coupled by way of an entraining member with a guide slide, such entraining member extending through a longitudinal slot, such slide being arranged to be moved on a linear guide, which is attached to the housing, in the longitudinal direction of the housing, wherein the entraining member has a coupling section, which is formed by its outer end section, fitting between the guide slide and a force transmitting part attached to it, the entraining member being engaged, without any direct attachment to the guide slide by way of a plug connection, in an interlocking manner with a coupling socket, such coupling socket being formed on the inner side, facing the guide slide, of the force transmitting part.

2. The linear drive as set forth in claim 1, wherein the coupling section is so interlockingly fitted in the coupling socket that it is able to be moved at least to a limited extent in a plane perpendicular to the longitudinal direction of the housing in relation to the force transmitting part and to the guide slide.

3. The linear drive as set forth in claim 1, wherein the coupling socket comprises two lateral limiting faces which are aligned in the longitudinal direction of the housing and face each other, the coupling section of the entraining member fitting between such limiting faces.

4. The linear drive as set forth in claim 1, wherein the coupling socket is constituted by a recess formed at the inner side of the force transmitting part.

5. The linear drive as set forth in claim 4, wherein the coupling socket is laterally limited by rib-like projections of the force transmitting part.

6. The linear drive as set forth in claim 1, wherein the force transmitting part is an integral plastic molding.

7. The linear drive as set forth in claim 1, wherein the force transmitting part is designed in the form of a housing and possesses an inner space open toward the inner side, in which inner space the coupling socket is located.

8. The linear drive as set forth in claim 1, wherein the force transmitting part is arranged to the side on the guide slide.

9. The linear drive as set forth in claim 1, wherein the force transmitting part extends along the entire length of the guide slide.

10. The linear drive as set forth in claim 1, wherein the force transmitting part constitutes a cover for the section, arranged clear of the longitudinal slot, of the entraining member and the length section, placed at the same axial level, of the longitudinal slot.

11. The linear drive as set forth in claim 1, comprising centering means are provided on the force transmitting part and on the guide slide for this purpose of force transmission taking place in the longitudinal direction of the housing and said centering means interlocking athwart the longitudinal direction of the housing.

12. The linear drive as set forth in claim 11, wherein the centering means comprise at least one pair of interlocking and complementary centering projections and centering recesses.

13. The linear drive as set forth in claim 1, wherein the force transmitting part is screwed to the guide slide by means of screw connection means extending athwart the longitudinal direction of the housing.

14. The linear drive as set forth in claim 1, wherein the linear guide possesses guide sections on its two mutually opposite longitudinal sides, such guide sections being adapted to cooperate with the guide slide, such guide sections defining a guide plane, with respect to which the slot plane containing the longitudinal slot extends obliquely at an acute angle, the force transmitting part being mounted at the same level as the guide plane laterally on the guide slide.

15. The linear drive as set forth in claim 1, comprising a design adapted for fluid power operation and in the case of which the drive part is a fluid power operated piston and in the case of which the longitudinal slot is provided with a band-like sealing means.

* * * * *